Patented Feb. 19, 1935

UNITED STATES PATENT OFFICE 1,991,505

DISAZO DYE AND METHOD FOR ITS PREPARATION

Henry Jordan, Wilmington, Del., assignor to E. I. du Pont de Nemours & Company, Wilmington, Del., a corporation of Delaware No Drawing. Application May 4, 1932, Serial No. 609,270

18 Claims. (Cl. 260—83)

This invention relates to azo dyes and more particularly refers to green disazo dyes and methods for their production.

The object of this invention is to produce green azo dyes capable of dyeing cotton and regenerated cellulose in fast brilliant shades. Another object is to produce azo dyes which may be diazotized on the fiber and developed with any of the usual developing solutions to produce fast brilliant shades. A still further object is to produce azo dyes which may be discharged to a pure white with any of the ordinary discharge mediums. Additional objects will appear hereinafter.

These objects are attained by the present invention wherein an aromatic amino compound not containing a free sulfo or carboxyl group is diazotized and coupled to 1-amino-2-naphthol-ether-6(or 7)-sulfonic acid. This aminoazo compound is then diazotized and coupled in an alkaline medium to an amino-aroyl-1-amino-8-naphthol-sulfonic acid. The material to be dyed may be treated with a solution of this disazo dye and the treated material diazotized and developed with any of the usual developing solutions, such as acyl-acetarylides, aryl-alkyl-pyrazolones, and alkyl ketoles.

The new dyes produced by the process of the present invention will probably have the following general formula:

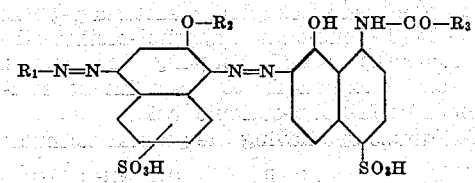

wherein $R_1$ represents an aromatic radical not containing a free sulfo or carboxyl group, $R_2$ represents an alkyl group and $R_3$ an aryl group containing a free external amino group.

This invention may be more completely understood by reference to the following examples:

Example 1

Ninety-three (93) parts of aniline were diazotized in the usual way. The diazo solution was added to a solution of 253 parts of 1-amino-2-naphthol-methyl-ether-6-sulfonic acid in 5000 parts of water and 280 parts of sodium acetate crystals. The coupling temperature was 5–10° C. The reaction should be acid to litmus. After stirring over night the coupling was finished. It was heated to 70° C. and filtered. The filter cake was then dissolved in 6000 parts of water and 60 parts of sodium hydroxide. 90 parts of sodium nitrite was added and the mixture was then added to a mixture of ice and 400 parts of a 31% hydrochloric acid solution, maintaining the temperature of the diazotization at 0–5° C. After stirring for about 1 hour the diazotization should be complete.

Three hundred fifty-eight (358) parts of p-amino-benzoyl-1-amino-8-naphthol-4-sulfonic acid were dissolved in 3000 parts of water and 53 parts of sodium carbonate. 2000 parts of ice were added to the solution and after that 1000 parts of sodium chloride, thus reducing the temperature to about −10° C. There was then added 320 parts of a 28% ammonium hydroxide solution and the diazo solution was then added slowly to this mixture, maintaining a temperature of −10 to −5° C. More ice may be added if necessary. After all the diazo compound had been added the coupling was allowed to stir for half an hour. The green dye was precipitated out of solution and filtered cold. For purification the filter cake was stirred up again with 5000 parts of water, heated to 70° C., 75 parts of sodium carbonate and 500 parts of salt were added and then the dye was filtered again. In its dry ground form it represented a dark bronzy powder, soluble in cold water with a bluish-violet color which turned to a bright bluish-green when heated to about 70–80° C. In concentrated sulfuric acid it was soluble with a dull grey coloration. It dyed cotton and rayon in bright bluish-green shades which, when diazotized on the fiber and developed with phenyl-methyl-pyrazolone, changed to a bright very yellowish-green. The developed dyeings showed a remarkable fastness to washing; they discharged with a reducing discharge medium, as sodium hydrosulfite, to a pure white. When developed with aceto-acetanilide instead of pyrazolone the shades obtained were considerably bluer and slightly brighter than those with pyrazolone.

The new dye most probably had the following formula:

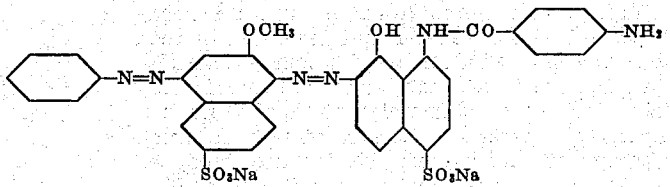

since on reduction with stannous chloride there was obtained: aniline, 1:4-diamino-2-methoxy-naphthalene-6-sulfonic acid and p-amino-benzoyl-1-amino-8-hydroxy-7-amino-naphthalene-4-sulfonic acid.

Example 2

If in Example 1 the 93 parts of aniline were substituted by 137 parts of para-phenetidine, leaving all other conditions the same, a dye would be obtained the direct and developed dyeings of which were still yellower than the corresponding dyeings of the aniline dye. Its properties were similar to the aniline dye. This dye would most probably have the following formula:

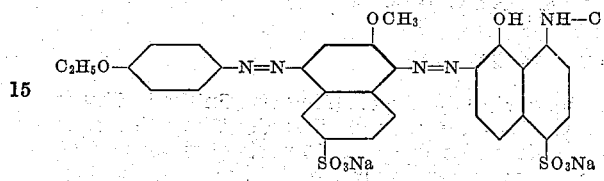

This dye represented in its dry, ground form a dark bronzy powder, soluble in cold water with a blue coloration, which turned to a bright green on heating to 70–80° C. In concentrated sulfuric acid the dye dissolved with a dark blue coloration. On reduction with stannous chloride the same products were obtained as in Example 1 except para-phenetidine was obtained instead of aniline.

In the above examples, in place of aniline and para-phenetidine, other amino compounds of the aromatic series which do not contain a free sulfo or carboxyl group may be used. Some of the compounds which were used with very satisfactory results were p-chloroaniline, o-chloroaniline, m-chloroaniline, ortho-, meta-, and para-toluidine, the various xylidines, anisidines, cresidines, amino-benzamides, mono- and di-alkyl-benzamides, as well as members of the amino-naphthalene class.

The 1-amino-2-naphthol-methyl-ether-6-sulfonic acid may be replaced by the corresponding 7-sulfonic acid; and also by other alkyl-ether derivatives, such as ethyl or butyl, without impairing the beautiful brilliant shades of the finished dye.

The third intermediate, para-amino-benzoyl-1-amino-8-naphthol-4-sulfonic acid, may likewise be replaced by various other compounds such as the meta-amino-benzoyl compounds. The sulfonic acid group may occupy some position other than the four position, such as 1-amino-8-naphthol-3-sulfonic acid. The amino-benzoyl radical may also have substituted therein various groups such as the alkyl, alkoxy, hydroxy, halogen, and nitro groups.

The compounds produced by the process of the present invention have an exceptional affinity for cotton and regenerated cellulose. On this material they produce valuable bright green shades. These shades are very fast to washing and may be discharged to a pure white with an ordinary discharge medium. Since the end component contains a free amino group the disazo dye may be diazotized on the fiber and developed thereon with any of the customary developing solutions. This feature is a great advantage and is very valuable from a commercial standpoint, since it permits the material to be dyed directly, in which case bright bluish-green shades are produced thereon; or the dye may be developed on the fiber producing brilliant yellowish-green shades. Although many different compounds may be used in this process the resultant shades differ very slightly from each other. This naturally is a tremendous commercial advantage, since the manufacturer can choose the compounds which are cheaper and more accessible.

As many apparently widely different embodiments of this invention may be made without departing from the spirit and scope thereof it is to be understood that I do not limit myself to the specific embodiments thereof except as defined in the appended claims.

I claim:

1. The process of producing a disazo dye which comprises diazotizing an aminoazo compound prepared by coupling an aromatic diazo compound to 1-amino-2-naphthol-alkyl-ether-sulfonic acid, and coupling the resulting diazo-azo compound to an amino-benzoyl-1-amino-8-naphthol-sulfonic acid.

2. The process of producing a disazo dye which comprises diazotizing an aminoazo compound prepared by coupling a diazotized amino compound of the benzene or naphthalene series, not containing a free sulfo or carboxyl group, to 1-amino-2-naphtholalkyl-ether-sulfonic acid, and coupling the resulting diazo-azo compound to an amino-benzoyl-1-amino-8-naphthol-sulfonic acid.

3. The process of producing a disazo dye which comprises diazotizing an aminoazo compound prepared by coupling a diazotized amino compound of the benzene series, not containing a free sulfo or carboxyl group, to 1-amino-2-naphthol-alkyl-ether-6-sulfonic acid, and coupling the resulting diazo-azo compound to an amino-benzoyl-1-amino-8-naphthol-sulfonic acid.

4. The process of producing a disazo dye which comprises diazotizing an aminoazo compound prepared by coupling diazotized p-phenetidine to 1-amino-2-naphthol-methyl-ether-6-sulfonic acid, and coupling the resulting diazo-azo compound to p-amino-benzoyl-1-amino-8-naphthol-4-sulfonic acid.

5. A disazo dye having the general formula:

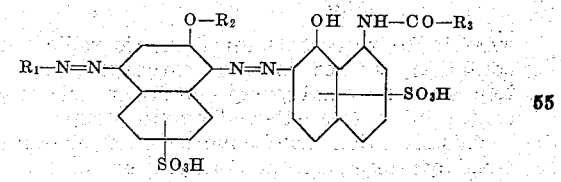

wherein $R_1$ is an aromatic radical, $R_2$ is an alkyl group, and $R_3$ is a phenyl group containing a free external amino group.

6. A disazo dye having the formula:

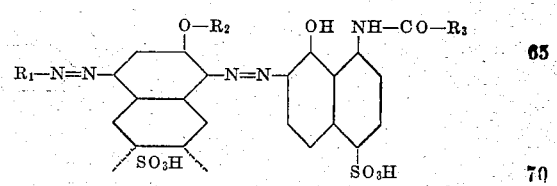

wherein $R_1$ is an aromatic radical of the benzene or naphthalene series, not containing a free sulfo or carboxyl group, $R_2$ is an alkyl group, and $R_3$ is a phenyl group containing a free external amino group.

7. A disazo dye having the formula:

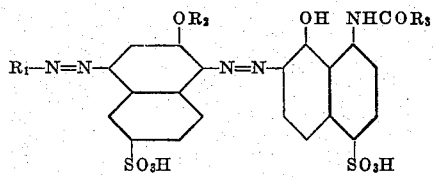

wherein $R_1$ is an aromatic radical of the benzene or naphthalene series, not containing a free sulfo or carboxyl group, $R_2$ is an alkyl group, and $R_3$ is a phenyl group containing a free external amino group.

8. A disazo dye having the general formula:

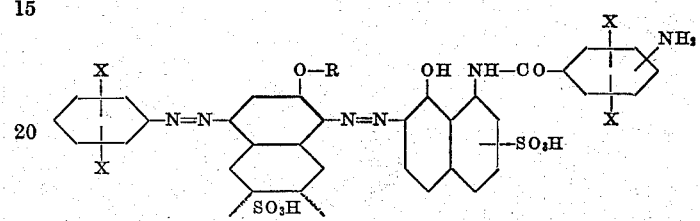

wherein R is an alkyl group, and X is a hydrogen, alkyl, alkoxy or halogen group.

9. A disazo dye having the following formula:

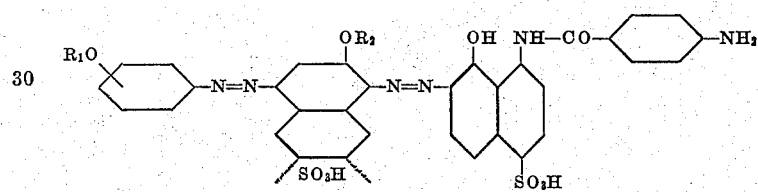

wherein $R_1$ and $R_2$ represent alkyl groups.

10. The azo dyestuffs of the general formula:

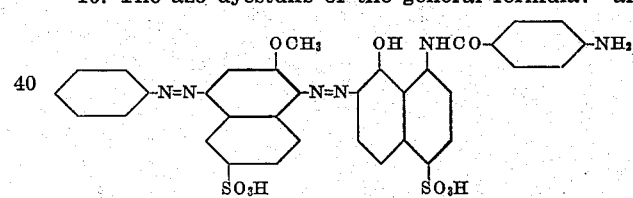

wherein the benzoyl radical may be substituted by alkyl, alkoxy or halogen.

11. A disazo dye having the formula:

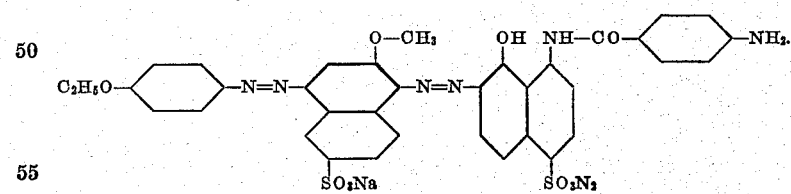

12. A disazo dye having the following formula:

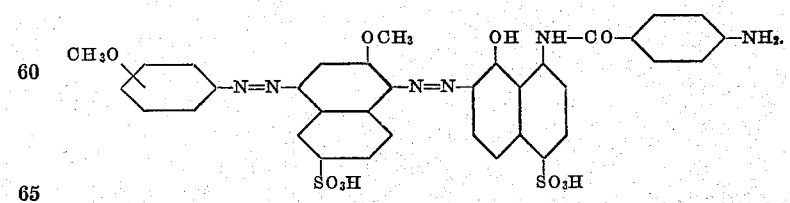

13. A disazo dye containing the grouping 1-aryl-azo-2-naphthol-alkyl-ether-sulfonic acid coupled to an end component which is an aminobenzoyl-1-amino-8-naphthol-sulfonic acid.

14. A disazo dye containing the grouping 1-aryl-azo-2-naphthol-methyl-ether-6-sulfonic acid coupled to an end component which is an amino-benzoyl-1-amino-8-naphthol-4-sulfonic acid.

15. The disazo dye substantially identical with that produced by the process of claim 1, which produces bright bluish-green shades on vegetable fibers, and which when diazotized on the fiber and developed with phenyl-methyl-pyrazolone produces bright yellowish-green shades exceptionally fast to washing.

16. The disazo dye substantially identical with that produced by the process of claim 2, which produces bright bluish-green shades on vegetable fibers, and which when diazotized on the fiber and developed with phenyl-methyl-pyrazolone produces bright yellowish-green shades exceptionally fast to washing.

17. The disazo dye substantially identical with that produced by the process of claim 3, which produces bright bluish-green shades on vegetable fibers, and which when diazotized on the fiber and developed with phenyl-methyl-pyrazolone produces bright yellowish-green shades exceptionally fast to washing.

18. The disazo dye substantially identical with that produced by the process of claim 4, which produces bright bluish-green shades on vegetable fibers, and which when diazotized on the fiber and developed with phenyl-methyl-pyrazolone produces bright yellowish-green shades exceptionally fast to washing.

HENRY JORDAN.